(12) United States Patent
Russell

(10) Patent No.: US 7,837,029 B2
(45) Date of Patent: Nov. 23, 2010

(54) WEAR-RESISTANT CONNECTOR FOR A MODULAR LINK CONVEYOR BELT

(75) Inventor: Mark D. Russell, Hermitage, TN (US)

(73) Assignee: Span Tech LLC, Glasgow, KY (US)

( * ) Notice: Subject to any disclaimer, the term of this patent is extended or adjusted under 35 U.S.C. 154(b) by 209 days.

(21) Appl. No.: 11/515,542

(22) Filed: Sep. 5, 2006

(65) Prior Publication Data

US 2007/0051588 A1 Mar. 8, 2007

Related U.S. Application Data

(60) Provisional application No. 60/713,880, filed on Sep. 2, 2005, provisional application No. 60/788,650, filed on Apr. 3, 2006.

(51) Int. Cl.
*B65G 17/06* (2006.01)

(52) U.S. Cl. ............ 198/851; 198/850; 198/852; 198/853; 24/33 L; 474/214; 427/248.1

(58) Field of Classification Search ......... 198/850–853, 198/953; 474/214; 427/248.1; 384/907, 384/907.1; 24/33 R, 33 L, 33 A
See application file for complete search history.

(56) References Cited

U.S. PATENT DOCUMENTS

| | | | |
|---|---|---|---|
| 3,648,825 A | 3/1972 | Burstein | |
| 3,985,224 A | 10/1976 | Harvey | |
| 4,023,239 A | 5/1977 | Stolz | |
| 4,024,605 A | 5/1977 | Henke | |
| 4,195,887 A | 4/1980 | Ruddell | |
| 4,266,660 A | 5/1981 | Herman | |
| 4,722,689 A | 2/1988 | Corbett | |
| 4,895,248 A | 1/1990 | Wahrén | |
| 5,048,675 A | 9/1991 | Nadalutti | |
| 5,125,874 A * | 6/1992 | Fryer et al. | .......... 474/214 |
| 5,226,856 A | 7/1993 | Iacchetta et al. | |
| 5,238,749 A | 8/1993 | Cueman et al. | |
| 5,346,060 A | 9/1994 | Ferguson | |
| 5,549,193 A | 8/1996 | Schlueter, Jr. et al. | |
| 5,579,898 A | 12/1996 | Nakagawa et al. | |
| 5,586,643 A * | 12/1996 | Zabron et al. | .......... 198/853 |
| 5,775,480 A | 7/1998 | Lapeyre et al. | |
| 5,829,954 A | 11/1998 | Pruett | |

(Continued)

FOREIGN PATENT DOCUMENTS

EP 1 435 377 7/2004

(Continued)

OTHER PUBLICATIONS

Darryl L. Ulrich, "User's Guide to Powder Coating Third Edition," Society of Manufacturing Engineers, Dearborn, Michigan, 120 pps.

(Continued)

*Primary Examiner*—Douglas A Hess
(74) *Attorney, Agent, or Firm*—King & Schickli, PLLC

(57) ABSTRACT

A connector for connecting modular conveyor links to form a belt includes a rod-like core and a powder coating forming a protective shell. The core may be stainless steel and the powder coating may be nylon.

24 Claims, 6 Drawing Sheets

U.S. PATENT DOCUMENTS

| | | | |
|---|---|---|---|
| 5,954,190 A | 9/1999 | Takahashi et al. | |
| 6,059,097 A * | 5/2000 | Clopton | 198/852 |
| 6,164,439 A | 12/2000 | Stebnicki et al. | |
| 6,212,739 B1 * | 4/2001 | Crook et al. | 24/33 P |
| 6,247,582 B1 | 6/2001 | Stebnicki et al. | |
| 6,250,459 B1 * | 6/2001 | Coen et al. | 198/852 |
| 6,270,855 B1 | 8/2001 | Jung et al. | |
| 6,280,798 B1 | 8/2001 | Ring et al. | |
| 6,360,881 B2 | 3/2002 | Stebnicki et al. | |
| 6,364,094 B1 * | 4/2002 | Alstmar | 198/852 |
| 6,398,002 B1 | 6/2002 | Choquette et al. | |
| 6,460,691 B1 * | 10/2002 | Gaensewig et al. | 198/793 |
| 6,467,610 B1 | 10/2002 | MacLachlan | |
| 6,471,033 B2 | 10/2002 | Ulrich | |
| 6,494,312 B2 | 12/2002 | Costanzo | |
| 6,506,455 B1 | 1/2003 | Bru et al. | |
| 6,525,137 B1 | 2/2003 | Alex et al. | |
| 6,561,344 B1 | 5/2003 | Basse | |
| 6,578,704 B1 | 6/2003 | MacLachlan | |
| 6,601,698 B2 | 8/2003 | Jakob | |
| 6,648,129 B2 | 11/2003 | Sedlacek | |
| 6,666,328 B2 | 12/2003 | Sykora | |
| 6,687,961 B2 | 2/2004 | Miller et al. | |
| 6,695,135 B1 | 2/2004 | Lapeyre | |
| 6,758,323 B2 | 7/2004 | Costanzo | |
| 6,820,738 B2 | 11/2004 | Hara et al. | |
| 6,948,612 B2 | 9/2005 | Kobayashi et al. | |
| 6,966,435 B2 * | 11/2005 | Weiser et al. | 198/851 |
| 6,968,943 B2 | 11/2005 | Kilby et al. | |
| 6,986,420 B2 | 1/2006 | Weiser et al. | |
| 6,991,094 B2 | 1/2006 | Frost | |
| 6,994,209 B2 | 2/2006 | Cediel et al. | |
| 6,994,210 B2 | 2/2006 | Kerwel et al. | |
| 6,997,309 B2 | 2/2006 | Stebnicki et al. | |
| 7,008,229 B2 | 3/2006 | Stoller et al. | |
| 7,055,678 B2 * | 6/2006 | Gundlach et al. | 198/851 |
| 7,438,179 B2 * | 10/2008 | Gundlach | 198/853 |
| 2002/0172829 A1 | 11/2002 | Mori et al. | |
| 2003/0075420 A1 | 4/2003 | Larkins | |
| 2003/0096062 A1 | 5/2003 | Hoberman | |
| 2003/0118744 A1 | 6/2003 | Li et al. | |
| 2003/0171452 A1 | 9/2003 | Kuratsuji et al. | |
| 2003/0177752 A1 | 9/2003 | Nakagawa et al. | |
| 2004/0191555 A1 | 9/2004 | Germano | |
| 2005/0003973 A1 | 1/2005 | Lewis et al. | |
| 2005/0023113 A1 | 2/2005 | Karnes | |
| 2005/0061636 A1 | 3/2005 | Frost et al. | |
| 2005/0061637 A1 | 3/2005 | Kilby et al. | |
| 2005/0183936 A1 | 8/2005 | Neely et al. | |
| 2006/0054471 A1 | 3/2006 | Maeda | |

FOREIGN PATENT DOCUMENTS

| | | |
|---|---|---|
| GB | 1 168 030 | 10/1969 |
| WO | WO 00/55268 | 9/2000 |

OTHER PUBLICATIONS

Rilsan Fire Powder, "Thermoplastic Polymide 11 Powder" Case Files, Automotive, Slide No. 29/49, Version 2/Feb. 2002, 15 pps.

* cited by examiner

Chain Rod Abrasion Test 1

Before Test

| | Diameters of Chain Rods | | | | | |
|---|---|---|---|---|---|---|
| | Perpendicular to Center of Shaft | | | Tangent to Center of Shaft | | |
| | Top | Center | Bottom | Top | Center | Bottom |
| Stainless Steel 1 | 3.96 | 3.96 | 3.97 | 3.98 | 3.97 | 3.98 |
| Furniture White | 4.13 | 4.11 | 4.07 | 4.11 | 4.12 | 4.08 |
| Stainless Steel 2 | 4 | 3.98 | 3.97 | 3.97 | 3.97 | 3.97 |
| Antique White | 4.12 | 4.12 | 4.18 | 4.12 | 4.11 | 4.15 |
| White Water | 4.1 | 4.09 | 4.1 | 4.08 | 4.08 | 4.11 |
| Duralon 12 | 4.34 | 4.22 | 4.21 | 4.2 | 4.17 | 4.16 |

After Test

| | Diameters of Chain Rods | | | | | |
|---|---|---|---|---|---|---|
| | Perpendicular to Center of Shaft | | | Tangent to Center of Shaft | | |
| | Top | Center | Bottom | Top | Center | Bottom |
| Stainless Steel 1 | 3.98 | 3.99 | 3.97 | 3.97 | 3.97 | 3.97 |
| Furniture White | 4.14 | 4.14 | 4.06 | 4.07 | 4.03 | 4.04 |
| Stainless Steel 2 | 4.02 | 4.03 | 3.97 | 3.97 | 3.97 | 3.97 |
| Antique White | 4.13 | 4.11 | 4.15 | 4.1 | 4.03 | 4.11 |
| White Water | 4.09 | 4.07 | 4.1 | 4.05 | 4.01 | 4.09 |
| Duralon 12 | 4.32 | 4.23 | 4.21 | 4.19 | 4.16 | 4.16 |

Rotating @ 900 RPM in Sand Bath
Total Change in Diameters of Chain Rods (Run Time: 1 hr. 27 min.)

| After Test | Perpendicular to Center of Shaft | | | Tangent to Center of Shaft | | |
|---|---|---|---|---|---|---|
| | Top | Center | Bottom | Top | Center | Bottom |
| Stainless Steel 1 | 0.02 | 0.03 | 0 | -0.01 | 0 | -0.01 |
| Furniture White | 0.01 | 0.03 | -0.01 | -0.04 | -0.09 | -0.04 |
| Stainless Steel 2 | 0.02 | 0.05 | 0 | 0 | 0 | 0 |
| Antique White | 0.01 | -0.01 | -0.03 | -0.02 | -0.08 | -0.04 |
| White Water | -0.01 | -0.02 | 0 | -0.03 | -0.07 | -0.02 |
| Duralon 12 | -0.02 | 0.01 | 0 | -0.01 | -0.01 | 0 |

Total Diameter Loss

| | | |
|---|---|---|
| Stainless Steel 1 | 0.03 | mm |
| Furniture White | -0.14 | mm |
| Stainless Steel 2 | 0.07 | mm |
| Antique White | -0.17 | mm |
| White Water | -0.15 | mm |
| Duralon 12 | -0.03 | mm |

| Chain Rod Abrasion Test 2 | | | | | | |
|---|---|---|---|---|---|---|
| Diameters of Chain Rods(mm) | | | | | | |
| Before Test | Perpendicular to Center of Shaft | | | Tangent to Center of Shaft | | |
|  | Top | Center | Bottom | Top | Center | Bottom |
| Duralon 12 (1) | 4.12 | 4.18 | 4.18 | 4.18 | 4.22 | 4.21 |
| Stainless Steel 1 | 3.98 | 3.98 | 3.97 | 3.96 | 3.97 | 3.96 |
| Stainless Steel 2 | 3.97 | 3.97 | 3.98 | 3.97 | 3.97 | 3.97 |
| Duralon 12 (2) | 4.18 | 4.22 | 4.19 | 4.17 | 4.2 | 4.17 |
| Stainless Steel 3 | 3.98 | 3.97 | 3.98 | 3.97 | 3.97 | 3.97 |
| Stainless Steel 4 | 3.97 | 3.97 | 3.97 | 3.97 | 3.97 | 3.97 |

| Diameters of Chain Rods(mm) (Run Time: 2 hr. 24 min.) | | | | | | |
|---|---|---|---|---|---|---|
| After Time 1 | Perpendicular to Center of Shaft | | | Tangent to Center of Shaft | | |
|  | Top | Center | Bottom | Top | Center | Bottom |
| Duralon 12 (1) | 4.11 | 4.2 | 4.18 | 4.16 | 4.2 | 4.18 |
| Stainless Steel 1 | 3.97 | 3.97 | 3.96 | 3.96 | 3.95 | 3.95 |
| Stainless Steel 2 | 3.97 | 3.96 | 3.96 | 3.94 | 3.94 | 3.94 |
| Duralon 12 (2) | 4.18 | 4.21 | 4.19 | 4.14 | 4.19 | 4.13 |
| Stainless Steel 3 | 3.96 | 3.96 | 3.96 | 3.94 | 3.94 | 3.93 |
| Stainless Steel 4 | 3.97 | 3.96 | 3.96 | 3.94 | 3.93 | 3.92 |

| Diameters of Chain Rods(mm) (Run Time: 2 hr. 33 min.) | | | | | | |
|---|---|---|---|---|---|---|
| After Time 1 | Perpendicular to Center of Shaft | | | Tangent to Center of Shaft | | |
|  | Top | Center | Bottom | Top | Center | Bottom |
| Duralon 12 (1) | 4.11 | 4.17 | 4.18 | 4.15 | 4.19 | 4.16 |
| Stainless Steel 1 | 3.97 | 3.97 | 3.96 | 3.94 | 3.94 | 3.93 |
| Stainless Steel 2 | 3.97 | 3.96 | 3.97 | 3.92 | 3.93 | 3.93 |
| Duralon 12 (2) | 4.18 | 4.21 | 4.19 | 4.13 | 4.16 | 4.12 |
| Stainless Steel 3 | 3.96 | 3.96 | 3.96 | 3.92 | 3.92 | 3.91 |
| Stainless Steel 4 | 3.97 | 3.96 | 3.96 | 3.92 | 3.91 | 3.9 |

| Diameters of Chain Rods(mm) (Run Time: 3 hr. 38 min.) | | | | | | |
|---|---|---|---|---|---|---|
| After Time 1 | Perpendicular to Center of Shaft | | | Tangent to Center of Shaft | | |
|  | Top | Center | Bottom | Top | Center | Bottom |
| Duralon 12 (1) | 4.1 | 4.15 | 4.16 | 4.13 | 4.18 | 4.13 |
| Stainless Steel 1 | 3.96 | 3.95 | 3.97 | 3.91 | 3.91 | 3.9 |
| Stainless Steel 2 | 3.97 | 3.97 | 3.96 | 3.91 | 3.9 | 3.9 |
| Duralon 12 (2) | 4.17 | 4.2 | 4.18 | 4.1 | 4.15 | 4.07 |
| Stainless Steel 3 | 3.96 | 3.96 | 3.97 | 3.89 | 3.89 | 3.86 |
| Stainless Steel 4 | 3.96 | 3.95 | 3.96 | 3.89 | 3.89 | 3.87 |

| Rotating @ 900 RPM in Sand Bath | | | | | | |
|---|---|---|---|---|---|---|
| Total Change in Diameters of Chain Rods(mm) (Run Time: 8 hr. 35 min.) | | | | | | |
| After Test | Perpendicular to Center of Shaft | | | Tangent to Center of Shaft | | |
|  | Top | Center | Bottom | Top | Center | Bottom |
| Duralon 12 (1) | -0.02 | -0.03 | -0.02 | -0.05 | -0.04 | -0.08 |
| Stainless Steel 1 | -0.02 | -0.03 | 0 | -0.05 | -0.06 | -0.06 |
| Stainless Steel 2 | 0 | 0 | -0.02 | -0.06 | -0.07 | -0.07 |
| Duralon 12 (2) | -0.01 | -0.02 | -0.01 | -0.07 | -0.05 | -0.1 |
| Stainless Steel 3 | -0.02 | -0.01 | -0.01 | -0.08 | -0.08 | -0.11 |
| Stainless Steel 4 | -0.01 | -0.02 | -0.01 | -0.08 | -0.08 | -0.1 |

| Total Diameter Loss | | Distance From Outside of Shaft to Inside of Rod | |
|---|---|---|---|
| Duralon 12 (1) | -0.24 | mm | 53.29 | mm |
| Stainless Steel 1 | -0.22 | mm | 52.7 | mm |
| Stainless Steel 2 | -0.22 | mm | 52.58 | mm |
| Duralon 12 (2) | -0.26 | mm | 52.62 | mm |
| Stainless Steel 3 | -0.31 | mm | 53.34 | mm |
| Stainless Steel 4 | -0.3 | mm | 53.59 | mm |

| Chain Rod Abrasion Test 3 | | | | | | |
|---|---|---|---|---|---|---|
| Diameters of Chain Rods(mm) | | | | | | |
| Before Test | Perpendicular to Center of Shaft | | | Tangent to Center of Shaft | | |
| | Top | Center | Bottom | Top | Center | Bottom |
| Duralon 12 (1) | 4.21 | 4.17 | 4.12 | 4.18 | 4.14 | 4.12 |
| Duralon 12 (2) | 4.32 | 4.31 | 4.25 | 4.39 | 4.36 | 4.33 |
| Clear (1) | 4.02 | 3.98 | 4.04 | 4.09 | 4.08 | 4.07 |
| Clear (2) | 3.99 | 4.05 | 4.07 | 3.94 | 4.05 | 4.04 |
| Stainless Steel (1) | 3.97 | 3.97 | 3.98 | 3.96 | 3.96 | 3.96 |
| Stainless Steel (2) | 3.96 | 3.97 | 3.97 | 3.96 | 3.97 | 3.96 |

| Diameters of Chain Rods(mm) (Run Time: 7 hr. 5 min.) | | | | | | |
|---|---|---|---|---|---|---|
| After Time 1 | Perpendicular to Center of Shaft | | | Tangent to Center of Shaft | | |
| | Top | Center | Bottom | Top | Center | Bottom |
| Duralon 12 (1) | 4.2 | 3.97 | 3.98 | 4.12 | 3.96 | 3.95 |
| Duralon 12 (2) | 4.32 | 4.32 | 4.25 | 4.34 | 4.3 | 4.25 |
| Clear (1) | 4 | 3.98 | 4.03 | 4.05 | 4.02 | 3.97 |
| Clear (2) | 3.99 | 4.03 | 3.93 | 3.94 | 3.98 | 3.92 |
| Stainless Steel (1) | 3.96 | 3.96 | 3.96 | 3.91 | 3.9 | 3.87 |
| Stainless Steel (2) | 3.96 | 3.95 | 3.95 | 3.89 | 3.88 | 3.87 |

| Rotating @ 900 RPM in Sand Bath | | | | | | |
|---|---|---|---|---|---|---|
| Total Change in Diameters of Chain Rods(mm) (Run Time: 7hr. 5min.) | | | | | | |
| After Test | Perpendicular to Center of Shaft | | | Tangent to Center of Shaft | | |
| | Top | Center | Bottom | Top | Center | Bottom |
| Duralon 12 (1) | -0.01 | -0.2 | -0.14 | -0.06 | -0.18 | -0.17 |
| Duralon 12 (2) | 0 | 0.01 | 0 | -0.05 | -0.06 | -0.08 |
| Clear (1) | -0.02 | 0 | -0.01 | -0.04 | -0.06 | -0.1 |
| Clear (2) | 0 | -0.02 | -0.14 | 0 | -0.07 | -0.12 |
| Stainless Steel (1) | -0.01 | -0.01 | -0.02 | -0.05 | -0.06 | -0.09 |
| Stainless Steel (2) | 0 | -0.02 | -0.02 | -0.07 | -0.09 | -0.09 |

| Total Diameter Loss | | Distance From Outside of Shaft to Inside | |
|---|---|---|---|
| Duralon 12 (1) | -0.76 | mm | 53.29 | mm |
| Duralon 12 (2) | -0.18 | mm | 52.7 | mm |
| Clear (1) | -0.23 | mm | 52.58 | mm |
| Clear (2) | -0.35 | mm | 52.62 | mm |
| Stainless Steel (1) | -0.24 | mm | 53.34 | mm |
| Stainless Steel (2) | -0.29 | mm | 53.59 | mm |

*Fig. 10*

WEAR-RESISTANT CONNECTOR FOR A MODULAR LINK CONVEYOR BELT

This application claims the benefit of U.S. Provisional Patent Application Ser. No. 60/713,880, filed Sep. 2, 2005, and U.S. Provisional Patent Application Ser. No. 60/788,650, filed Apr. 3, 2006, the disclosures of which are incorporated herein by reference.

TECHNICAL FIELD

This invention relates generally to the conveyor art and, more particularly, to a wear-resistant connector for connecting modular links to form a conveyor belt.

BACKGROUND OF THE INVENTION

The use of modular link conveyors in industry enjoys increasing popularity. Particularly for conveying food articles or consumer products, especially in packages or in semi-packaged form, the modular link conveyor represents the overwhelming choice of those in the industry looking for a long-lasting, low cost conveying solution. In the recent past, significant advances in the development of such have been made so as to provide more efficient handling of an even larger variety of food articles, packages and containers, as well as other types of articles and products.

One of the most popular types of modular link conveyor systems on the market today, if not the most popular, is manufactured and sold by the assignee of the present invention under THE DESIGNER SYSTEM and WHISPER-TRAX trademarks, and illustrated and claimed in prior U.S. Pat. No. 4,953,693, Sep. 4, 1990 and U.S. Pat. No. 5,031,757, issued Jul. 16, 1991 (both of which patents are fully incorporated herein by reference). Since the time of these early patents in the art, the significant advances have been fast in coming to provide an even more efficient operation and better handling and transporting of articles and products.

Despite eliminating the deleterious catenary approach prevalent in the prior art and providing the advantageous secure holding by the guide links, an aesthetic problem sometimes arises from use of the preferred stainless steel connector to connect the modular links forming the conveyor belt. Specifically, wear particles, or "black oxide" from the connector may become embedded in light-colored links made from certain polymer materials, including Acetal (which, despite being an abrasion-resistant material, is considered to be fairly abrasive itself). Although not a problem from a durability or reliability standpoint, the resultant appearance of the dark-colored wear particles embedded in the links can lead to unfounded concerns regarding cleanability of the belt, especially in applications where food products are being conveyed. Particles separated from the stainless steel rod also further compound the problem by becoming embedded in the adjacent surface of the link, which then accelerate the wear.

In the past, others have proposed various types of modular link connectors, or "hinge pins" as they are sometimes called, made of polymer materials. While such polymer connectors do not create the same "black oxide" as stainless steel, they are not as able to resist significant shear loading and are also substantially more susceptible to creep. Over time, this creep causes polymer rods to assume an irregular, or "wavy," profile. This profile not only compromises the appearance and operation of the belt, but also makes it more difficult to remove the rods for replacement. Additionally, the dimensional pitch of the chain is lost, resulting in premature sprocket wear.

More recently, U.S. Pat. No. 6,648,129 to Sedlacek describes a "two material" hinge pin arrangement in which a rod made of a rigid material (such as steel) slidably receives a urethane outer tube. According to the patent, the urethane tube forms a high friction material that preferably rotates relative to the underlying rod to facilitate articulation (ostensibly as the result of particles becoming embedded in the space between the tube and the rod). Besides creating an arrangement that can be impossible to clean in an easy and economical fashion, the high friction surface of the outer tube may actually cause significant wear on the links, as well as the underlying rod in the event of relative rotation.

Accordingly, a need is identified for an improved connector for the links in a modular link conveyor belt. The rod should be exceptionally strong and resistant to the effects of creep, while also being suitable for use in even the most sensitive of conveying environments (including those in which food is transported). The rod should also be easy and inexpensive to manufacture using existing techniques, and thus would not contribute significantly to the cost of the overall conveyor system (which can include hundreds or thousands of these rods) or its wear. The rod should also be usable with existing conveyors, such as in a retrofit situation, without changing the design or principles of operation.

SUMMARY OF THE INVENTION

In accordance with a first aspect of the invention, an improvement is proposed for a system in which a first part includes a surface subjected to wear as the result of sliding frictional contact with a second part. The improvement comprises a powder coating applied to the surface of the first part. The powder coating serves to reduce friction between the first and second parts, provide enhanced wear resistance to the first part, and improve cleanability of the first part.

In one embodiment, the first part comprises metal, such as stainless steel, the powder coating comprises a polyamide, such as nylon, and the second part comprises a polymer material, such as acetal. Preferably, the second part comprises a link of a chain and the first part comprises a connector for engaging the link such that sliding friction results between the first and second parts. For instance, the link may include an opening for receiving the connector such that an outer surface of the connector including the powder coating frictionally engages a surface of the link within the opening. Most preferably, both the first and second parts are moving relative to each other, but possibly only one of the first or second parts is fixed and the other is moving.

In accordance with another aspect of the invention, a connector for connecting links of a conveyor belt is disclosed. The connector comprises an elongated core. A powder coating forms a shell on a surface of the core.

In one embodiment, the core comprises steel and, preferably, stainless steel. In that or another embodiment, the shell comprises nylon. Alternatively, the shell may comprise a material selected from the group consisting of PROTECH CHEMICAL LTD. Mercury Blue hybrid, SHERWIN WILLIAMS Whitewater polyester, SHERWIN WILLIAMS Antique White hybrid, THERMOCLAD White DURALON 12 (Nylon 12), THERMOCLAD Clear DURALON 12 (Nylon 12), SHERWIN WILLIAMS Furniture White polyurethane, and RILSAN nylon. Preferably, the shell is generally clear, but may be white in color, and further comprises a polymer material including an anti-microbial, anti-bacterial, anti-fungal, or germicidal agent.

In accordance with still another aspect of the invention, an elongated connector is provided for connecting links in a conveyor belt. The connector comprises a rod-like mild or stainless steel core. A nylon coating, such as an extruded tube or powder coated shell, is provided on a surface of the core.

In accordance with yet another aspect of the invention, a conveyor belt section comprises a plurality of links interconnected by an elongated connector. The connector comprises a rod-like body including a metal core and a powder coating forming a shell. Preferably, the links comprise acetal, the metal core comprises stainless steel, and the powder coating comprises nylon.

In accordance with still another aspect of the invention, a conveyor belt is disclosed. The belt comprises a plurality of links arranged in interdigitated rows and an elongated connector for connecting the links. The connector comprises a core and a powder coating forming an outer shell on the core.

Still another aspect of the invention is a method of forming a connector for the links in a conveyor belt. The method comprises powder coating a rod to form an outer protective shell on a surface of the rod. Preferably, the method involves powder coating nylon on a steel or stainless steel rod, such as by electrostatically applying nylon powder to a surface of the rod and then heating the rod to cure the powder and form a protective shell.

Yet a further aspect of the invention is a method of manufacturing a conveyor belt section from a plurality of interdigitated links. The method comprises coating a surface of a connector with a powder coating and connecting the interdigitated links with the coated connector. Preferably, but not necessarily, the coating step comprises electrostatically applying a nylon powder to a surface of the connector and then heating the connector (such as for a period greater than about 15 minutes and at a temperature greater than about 400°° F.). Most preferably, the coating step comprises placing nylon over an entire outer surface of the connector, which is preferably a metal rod.

In accordance with still a further aspect of the invention, a method is disclosed for manufacturing a conveyor belt section from a plurality of interdigitated links. The method comprises coating a surface of a connector with nylon and connecting the interdigitated links with the coated connector. Preferably, the coating step comprises electrostatically applying a nylon powder to a surface of the connector and then heating the connector (such as for a period greater than about 15 minutes and at a temperature greater than about 400° F.). Alternatively, the coating step may comprise placing an extruded tube over the connector, which is preferably a metal rod.

BRIEF DESCRIPTION OF THE DRAWINGS

FIGS. 8-10 are tables illustrating numerically the result of various experiments conducted to demonstrate the potential efficacy of the inventive aspects disclosed.

DETAILED DESCRIPTION OF THE INVENTION

Figure 1:
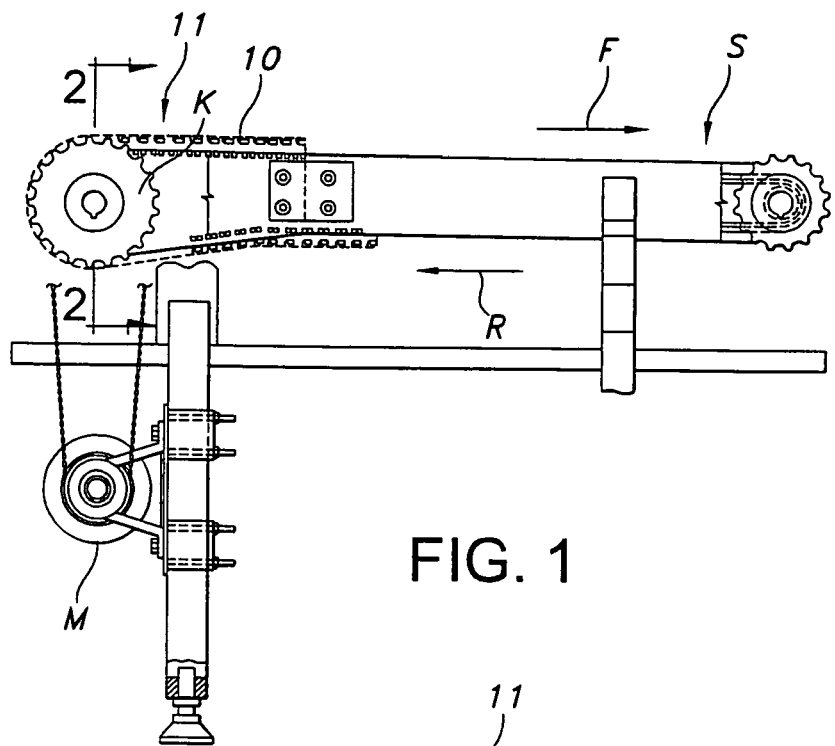
FIG. 1 is a partially schematic side view of an overall conveyor system.
Figure 2:
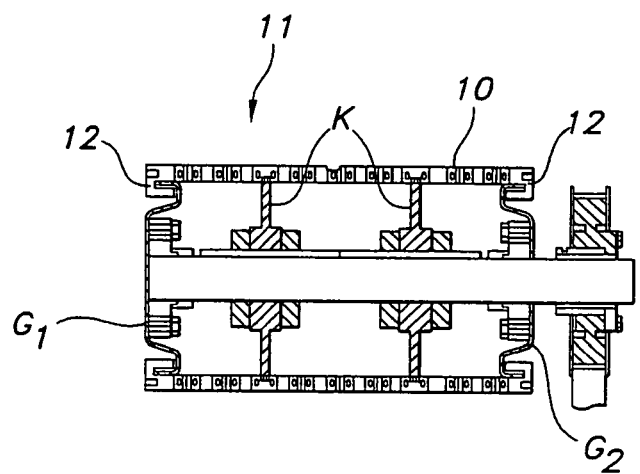
FIG. 2 is a cross-sectional view taken along line 2-2 of FIG. 1.
Figure 3:
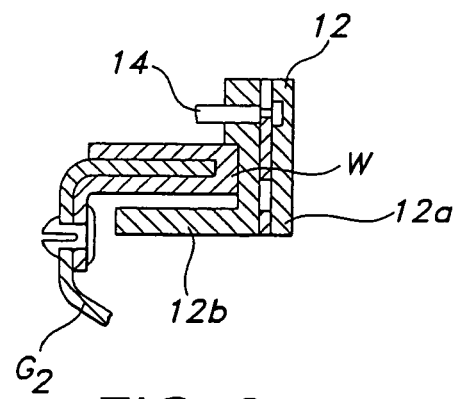
FIG. 3 is a cutaway, partially cross-sectional view of a wear strip associated with the guide rail for engaging a side link of the conveyor chain.
Figure 6:
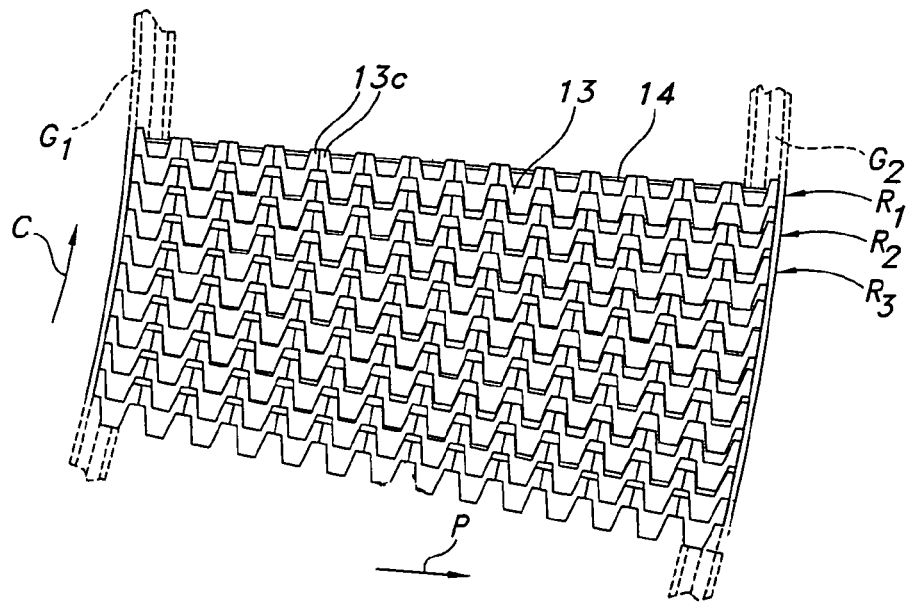
FIG. 6 is a top cutaway view showing the side-flexing capability of one embodiment of the disclosed conveyor chain.

Reference is now made to FIGS. 1 and 2, which depict an overall conventional arrangement of a conveyor system S including a belt or chain 10. The chain 10 includes a conveying surface 11 for engaging and supporting articles. In this particular embodiment, the chain 10 comprises or includes modular links including side guide links 12 and intermediate links 13 arranged in spaced apart rows (see FIG. 6 and note rows $R_1 \ldots R_n$), which thus partially create the conveying surface 11. Adjacent rows $R_1$, $R_2$ of links are interconnected by transversely extending connectors 14, which are also referred to in the vernacular as "cross rods," "hinge pins," etc.

With regard to the side links 12, and as perhaps best understood by viewing FIGS. 3 and 4a-4c, each may include an outer depending arm 12a and an inwardly projecting or extending transverse tab 12b (thus creating different right handed or left handed side links, depending on the particular positioning). When present, the depending arm 12a and transverse tab 12b are designed to receive a conventional support structure, which may include a longitudinally extending guide rail $G_1$ or $G_2$ forming part of the conveyor support frame. These guide rails $G_1$, $G_2$ support the chain 10 along both the forward run F and the return run R as it is bidirectionally driven in an endless path (such as by spaced sprockets K adapted for engaging the links along a transition from a forward run F to a return run R and gang-driven by an associated motor M).

Figure 5:
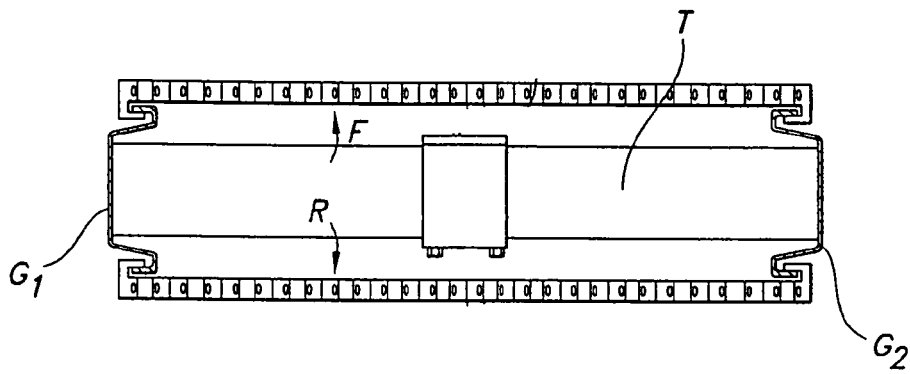
FIG. 5 is a partially cross-sectional end view of the modular link conveyor system including roller support rails for the upper and lower runs.

Each guide rail $G_1$ or $G_2$ preferably includes a wear strip W formed of a tribologically enhanced material to provide reduced friction contact with the links 12. The guide rails $G_1$ or $G_2$ may be C-shaped or sigma shaped, as shown in FIGS. 2 and 5, or instead may simply include one or more support sections of any desired shape carrying the associated wear strips W such that they project outwardly therefrom like a tongue or tenon and thus define a bearing surface for the chain 10 (and, in particular, the side guide links 12). Associated links of the sort mentioned are typically formed of complementary or matched materials, such as acetal or other inexpensive, lightweight, and durable materials using well-known forming techniques (including possibly co-molding of different materials). Although performance of the system 10 may be improved as a result, matching of the materials forming the links and guide rails (wear strips) is not considered a requirement.

Preferably, pairs of side links 12 together with intermediate links 13 form rows spaced apart in the direction in which the chain 10 is typically driven (referred to as the longitudinal direction or the conveying direction (note action arrow C in the plan view of FIG. 6)), since it corresponds to the main direction in which articles are conveyed by the chain 10 during normal operation, as opposed to the transverse or lateral direction P). To interconnect the pairs of links 12 forming a first (leading) row $R_1$, the transverse connector 14 takes the form of a stainless steel rod passing through aligned holes (see FIG. 6) formed in foot portions 13c of each intermediate link 13 (which may be more than two in cases where each link has plural laterally repeating sections), including the side link 12. During construction of the chain 10, the links 12, 13 of a second, adjacent (trailing) row $R_2$ interdigitate with those of the first row R₁, with the connector 14 passing through a slot 12*d* elongated in the conveying direction D and formed in the apex 12*e* of each link 12, 13 in the second row (and thereby forming a section of the chain 10).

As should be appreciated by those of skill in the art, this specific structural arrangement (which is considered entirely optional for purposes of the present invention in its broadest aspects) allows for the chain 10 to side-flex to negotiate curves or bends (see FIG. 6), as well as to compress or expand in the longitudinal direction, and thus eliminates the need for a catenary. If such enhanced functionality is not necessary for a particular application, the slots 12*e* could simply be replaced with plain holes for receiving the connector 14, which would this result in a non-side flexing, non-longitudinally compressible chain.

Figures 4A, 4B, 4C:
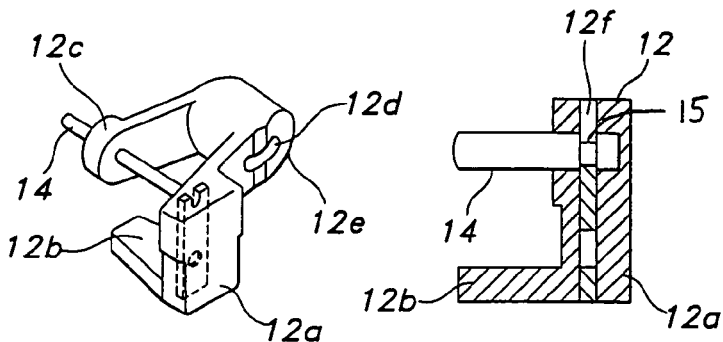
FIG. 4a is a perspective view of an exemplary side link.
FIG. 4b is a cross-sectional side view of the side link.
FIG. 4c is a cross-sectional side view of a tab for engaging a transverse connector.

The connector 14 may be retained in place by a retainer 16. In the illustrated embodiment, the retainer 16 is in the form of a tab 17 removably inserted in a receiver 12*f* or slot formed in each side link 12. As shown in FIG. 4*b*, the tab 17 may include a recess 17*a* for engaging a notched or recessed portion 15 of the connector 14. This pattern of assembly may be repeated among the interdigitated links 12, 13 as necessary to form a chain 10 having a particular length in the conveying direction. A full description of this type of chain or "belt" as it is sometimes called in the vernacular, is found in the commonly assigned '693 and '757 patents, the disclosures of which are fully incorporated herein by reference.

Figure 7:
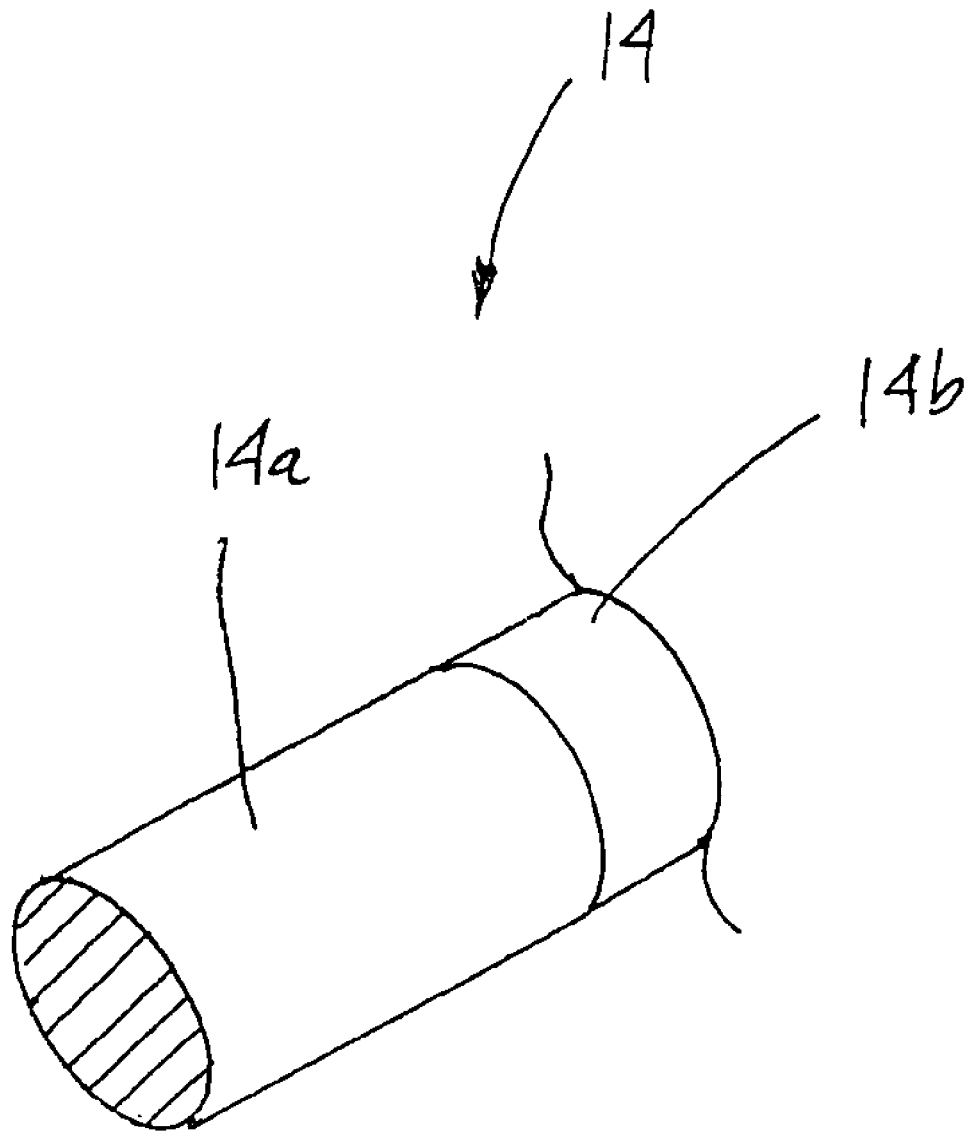
FIG. 7 is a perspective view showing a connector including a shell or coating made in accordance with one aspect of the invention.

With reference to FIG. 7, one aspect of the present invention is providing the connector 14 for at least one row of links at least partially with an outer coating. Specifically, this connector 14 is preferably formed of a rigid core 14*a* formed of an electrically conductive material, such as one made of mild or stainless steel (e.g., 303 or 304), and coated to create an outer coating or shell 14*b* comprised of a durable, wear and abrasion resistant material. In one particular embodiment, the shell 14*b* comprises a polyamide, such as nylon, and more preferably Nylon 11 or Nylon 12.

One version of Nylon 12 is distributed in powder form under the trademark DURALON 12 by the Thermoclad Company of Erie, Pa. Another version of nylon powder is sold under the trademark RILSAN by Arkema, Inc. of Birdsboro, Pa. However, the powder coating may comprise other durable, abrasion-resistant materials, with a preference for those that are polymer-based, such as polyethylene and epoxy coatings, and those identified in the examples provided herein (such as, for example, the following paints: PROTECH CHEMICAL LTD. Mercury Blue hybrid, SHERWIN WILLIAMS Whitewater polyester, SHERWIN WILLIAMS Antique White hybrid, and SHERWIN WILLIAMS Furniture White polyurethane).

The outer shell 14*b* may be formed by coating the core 14*a*, which may be done by placing (e.g., sliding or extruding) a tube or sleeve formed of nylon material over the outer surface. Preferably, the extruded tube or sleeve is made of nylon and bonded to the core 14*a*, such as by using an adhesive. However, the coating forming the shell 14*b* (which may also be considered a film) is most preferably applied to the core 14*a* by a powder coating process. Such process involves using an electrostatic delivery device (e.g., a gun) or fluidized bed to deliver the nylon in powder form to the entire outer surface of the core 14*a*, and then baking the powder at a relatively high temperature (e.g., greater than 400° F.) for a certain time period (e.g., greater than 15 minutes). This baking cures the powder and forms an outer coating (e.g., the shell 14*b*). Aside from being relatively easy and inexpensive to implement, this technique results in a durable, seamless coating, and one securely bonded to the surface of the core 14*a*, without the need to adhesives or the like (and without any appreciable gap in which food particles, debris, or the like may become trapped).

Regardless of how the shell 14*b* forms on the core 14*a* and the particular material used, the resulting coated composite connector 14 for use in conveyor belts provides numerous advantages over those presently available for such use, especially when the core 14*a* is made of stainless steel. First and foremost, the shell 14*b* prevents the deleterious "black oxide" problem from arising when the core 14*a* is made from stainless steel, including when used with white-colored links made of Acetal.

Secondly, even if the shell 14*b* is compromised in use, the underlying stainless steel forming the core 14*a* provides an additional layer of protection against corrosion. This is especially true where a perforation or scratch arises in a non-wearing area of the connector 14. This is because the thickness and resulting elevation of the remaining nylon tends to prevent direct contact from being made with the underlying surface of the stainless steel core 14*a*.

In the case of nylon, the shell 14*b* is also somewhat compliant, at least as compared to a metal such as stainless steel. Thus, unlike the conventional stainless steel rods, the shell 14*b* may act to receive and hold any wear particles that may be generated in an embedded fashion. This capturing helps to prevent wear particles once generated from embedding in any adjacent surface of the link and causing further deleterious wear on the connector 14, as occurs using the conventional arrangement.

Aside from being relatively hard (75+/−5 Shore D Hardness, in the case of Nylon 12) and offering superior abrasion resistance, the shell 14*b* when made of nylon also has low coefficient of friction, especially relative to other polymer materials from which links may be formed (including acetal). Thus, the shell 14*b* does not in any way compromise the operation or performance of the conveyor belt or chain 10. In fact, aside from eliminating the black oxide problem when used with a stainless steel cores it is believed that the properties of the shell 14*b* will actually extend the service life of the resulting belt by providing an added layer of protection against the effects of wear.

Finally, many coating materials capable of being used to form the shell 14*b*, including Nylon 12, are generally food grade and approved by the FDA for use with food products. Thus, providing the coating on the steel core 14*a* made of such FDA-compatible or food grade materials to form the shell 14*b* does not in any way impact the ability of the belt to be used in a conveyor for food products. Moreover, the shell 14*b* is believed to improve cleanability by providing a uniform, low friction surface over which cleaning fluids may freely pass and soft particles (such as debris from food products) do not readily adhere.

Preferably, the material associated with the core 14*a* to form the shell 14*b* is generally clear or translucent (e.g., cloudy but light transmissive) once cured. As a result, the coating is generally invisible, and the connector 14 appears to be made entirely from steel. This essentially hides the shell 14*b* and the existence of the coating from the consumer, and also facilitates retrofitting the coated connector into modular link belts or chains without coated connectors. However, it is also possible to make the coating opaque, or otherwise color it to match the color of the links forming the conveyor belt (e.g., a white coating for white links).

For food based applications, it may also be desirable to incorporate a germicidal, anti-microbial, anti-bacterial, and anti-fungal agent into the coating forming the shell 14*b*. Consequently, the resulting rod 14 would not only be able to resist the growth of undesirable microbes, fungi, germs or bacteria, but would also help to prevent these undesirable entities from propagating (especially in "hidden" or closed areas where the rod passes through cavities or recesses in the links). Suitable types of such agents may be found in U.S. Pat. Nos. 6,180, 039, 6,039,964, 5,941,369, and 5,586,643, the disclosures of which are incorporated herein by reference. Alternatively, titanium dioxide having a small particle size can be incorporated into the powder coating, which when cured and bombarded with UV rays serves to attack both inorganic and organic compounds and turn them into molecules that can be harmlessly washed away using water.

Thus, with reference back to FIGS. 1-6, the system 10 can alternatively be characterized as including a first part, such as the metal connector 14 (preferably formed of stainless steel), with a surface subjected to wear as the result of sliding frictional contact with a second part, such as the link 12 or 13 (preferably made of a polymer material and, most preferably, acetal). In such case, a polymer powder coating or shell, such as one made of a polyamide (e.g., nylon) may be applied to the surface of the connector 14 to reduce friction with the link 12 or 13, provide enhanced wear resistance to the connector 14, and improve its cleanability. Accordingly, an outer surface of the connector 14 including the powder coating frictionally engages a surface of the link 12, 13 within the opening, including during relative movement between the two (such as when both the connector and link are moving relative to each other, or when the connector moves while the link remains fixed or vice versa).

The following tests demonstrate the efficacy of the proposed invention.

Manufacturing Test

A white polymer-based (DURALON 12 brand Type 12 nylon) powder coating from Thermoclad was applied to an elongated, generally cylindrical four millimeter diameter rod made of stainless steel (303) using an electrostatic gun. The rod with the powder coating was then baked in an oven at a curing temperature of about 400-425° F., for about 15-20 minutes.

The resulting composite connector had a durable, seamless shell having a thickness of about 0.003 to 0.005 inches. This added thickness would not contribute significantly to the diameter and thus could be used with existing links or in a retrofit situation.

Painting Test

In order to assess the potential to powder coat stainless steel, a variety of different powder coat paints were tried. These included the following paint types:
 1. PROTECH CHEMICAL LTD. Mercury Blue hybrid
 2. SHERWIN WILLIAMS Whitewater polyester
 3. SHERWIN WILLIAMS Antique White hybrid
 4. THERMOCLAD White DURALON 12 (Nylon 12)
 5. THERMOCLAD Clear DURALON 12 (Nylon 12)
 6. SHERWIN WILLIAMS Furniture White polyurethane All of these powder-coat paint types were successfully applied to the stainless steel rods and should provide adequate performance in terms of preventing the creation of the black oxide.

Conveyor Test

Two identical conveyors were assembled using a conveyor test bed allowing two parallel conveyors to operate identically. One conveyor was assembled using standard stainless steel rods. The other conveyor was assembled using standard stainless steel rods that had been coated with an Antique White hybrid powder coat paint produced by SHERWIN WILLIAMS. This test was designed to determine if the black oxide formation could be prevented by introducing a material between the acetal links and the stainless steel.

After continuous operation of the test bed was started, black oxide formation was observed on the bare stainless steel rods within a few days. This black oxide formation has continued to progress throughout the bare-stainless-steel-rod chain. No black oxide formation was noted on the chain with rods coated with the hybrid powder coat paint for 7½ weeks with only brief (less than one hour) interruptions to observe the progress.

Accelerated Abrasion Test

In order to test aggressively the abrasion resistance of the powder coating, rods were mounted in a holder, immersed in a sand/water slurry bath, and the assembly rotated continuously. This results in rapid wear of the rods. As described below, a total of three different tests have been conducted.

In the first test four different powder coat materials applied to a stainless steel rod were tested along with a bare stainless steel control rod.

The four materials were:
 1. SHERWIN WILLIAMS Whitewater polyester paint
 2. SHERWIN WILLIAMS Antique White hybrid paint
 3. THERMOCLAD White DURALON 12 (Nylon 12)
 4. SHERWIN WILLIAMS Furniture White polyurethane paint.

After less than 2 hours of operation, the polyester, hybrid, and polyurethane paints had all been worn through to the underlying stainless steel. The Nylon 12 and the bare stainless steel rods showed substantially less wear. FIG. 8 shows a summary of the total wear on each of the six rods that were tested.

The second test was a direct comparison of the Nylon 12 coating and the bare stainless steel. A total of approximately eight hours of testing resulted in the stainless steel rods and the Nylon 12 coated rods showing essentially identical wear rates. FIG. 9 shows a summary of the total wear on each of the six rods that were tested.

A third test was conducted to evaluate white DURALON 12 applied by Electrostatic Technology, Inc. of Branford, Conn., clear DURALON 12 applied using an electrostatic gun, and bare stainless steel. This test was conducted for a total of approximately seven hours.

Again, the stainless steel rods and two (DURALON 12 (2) and clear (1)) of the Nylon 12 coated rods showed essentially identical wear rates. The remaining two Nylon 12 coated rods (DURALON 12 (1) and clear (2)) were worn through to the metal and had the coating peeled back. As a result, the wear measurements for these two test pieces show that they had more wear than would occur during normal use over a significant period. It seems likely that the peeling away is simply the extension of the failure process. FIG. 10 summarizes the total wear on each of the six rods tested.

Oscillating Wear Test

In order to test the ability of various types of powder-coat materials to resist abrasion wear an oscillating-wear test machine was set up. This machine is designed to test a variety of different ways that the rods may move relative to the acetal links.

Three different powder coat materials or paints were placed into the machine to test along with a standard stainless steel rods. The three materials were:
 1. SHERWIN WILLIAMS Whitewater polyester
 2. SHERWIN WILLIAMS Antique White hybrid
 3. THERMOCLAD White DURALON 12 (Nylon 12)

A review of the condition of the rods and the links in the test machine approximately one month after the test began revealed no visually apparent wear on any of the coated rods. A subsequent inspection a week later showed that the bare stainless steel rods were beginning to show the presence of black oxide while all of the coated rods showed no black oxide. Thus, all three of the tested paints appear to prevent the formation of the black oxide. Additionally, they have at least initially adequate resistance to wear.

The foregoing description of various embodiments of the present invention have been presented for purposes of illustration and description. The description is not intended to be exhaustive or to limit the invention to the precise forms disclosed. Obvious modifications or variations are possible in light of the above teachings. For instance, although there is a definite preference for coating the entire core 14a to form the connector, it is possible to provide the coating strategically to cover only areas of contact (and thus wear) with the links. Likewise, the coating need not be applied in any notches, recesses, or indentations in the connector that will not contact with the link surface in use. Although a cylindrical rod is disclosed as the connector, it may have any desired cross-sectional shape or form. The embodiments described provide the best illustration of the principles of the invention and its practical applications to thereby enable one of ordinary skill in the art to utilize the invention in various embodiments and with various modifications as are suited to the particular use contemplated. All such modifications and variations are within the scope of the invention.

The invention claimed is:

1. In a conveyor system having a first conveyor part with a surface subjected to wear as the result of sliding frictional contact with a second conveyor part, the improvement comprising:
  a powder coating applied to the surface of the first conveyor part to form a durable outer shell substantially over the entirety of the first conveyor part without a gap between the outer shell and the second conveyor part in which food particles or debris may become trapped,
  whereby the outer shell serves to reduce friction between the first and second conveyor parts, provides enhanced wear resistance to the first conveyor part by preventing surface contact with the material underlying the outer shell, and improves cleanability of the first conveyor part.

2. The system of claim 1, wherein the first part comprises stainless steel.

3. The system of claim 1, wherein the powder coating comprises a polyamide.

4. The system of claim 1, wherein the powder coating comprises nylon.

5. The system of claim 1, wherein the second part comprises a polymer material.

6. The system of claim 1, wherein the second part comprises acetal.

7. The system of claim 1, wherein the second part comprises a link of a chain and the first part comprises a connector for engaging the link such that sliding friction results.

8. The system of claim 7, wherein the link includes an opening for receiving the connector such that the surface of the connector including the powder coating frictionally engages a corresponding surface of the link within the opening.

9. The system of claim 1, wherein one of the first or second parts is fixed and the other is moving.

10. A method of manufacturing a conveyor belt section from a plurality of interdigitated links, comprising:
  providing a surface of a connector with a powder coating to form a durable outer shell without a gap between the connector and the outer shell in which food particles or debris may become trapped; and
  connecting the interdigitated links with the coated connector.

11. The method of claim 10, wherein the providing step comprises electrostatically applying a nylon powder to a surface of the connector and then heating the connector.

12. The method of claim 10, wherein the heating step is for a period greater than about 15 minutes and at a temperature greater than about 400° F.

13. The method of claim 10, wherein the providing step comprises placing nylon over an entire outer surface of the connector.

14. A method of manufacturing a conveyor belt section from a plurality of interdigitated links, comprising:
  providing an outer surface of a steel connector with a nylon coating to form a durable outer shell without a gap between the outer shell and the steel connector in which food particles or debris may become trapped; and
  connecting the interdigitated links with the coated connector.

15. The method of claim 14, wherein the providing step comprises electrostatically applying a nylon powder to a surface of the connector and then heating the connector.

16. The method of claim 15, wherein the heating step is for a period greater than about 15 minutes and at a temperature greater than about 400° F.

17. In a conveyor for conveying articles in a conveying direction, said conveyor having a first link having a surface subjected to wear as the result of contact with a generally cylindrical stainless steel connector for connecting the first link with a second link, the improvement comprising a powder coat applied to the surface of the stainless steel connector to form a durable outer shell without a gap between the outer shell and the connector in which food particles or debris may become trapped.

18. The conveyor according to claim 17, wherein the powder coat comprises nylon.

19. The conveyor according to claim 17, wherein the stainless steel connector further includes at least one notch.

20. In a conveyor system having a plurality of interdigitated links connected by a metal connector rod having a surface subjected to wear as the result of sliding frictional contact with one or more of the links, the improvement comprising a powder coating applied to the surface of the metal connector rod to form a durable outer shell without a gap between the connector rod and the outer shell in which food particles or debris may become trapped, whereby the outer shell serves to reduce friction between the links and the connector rod, provides enhanced wear resistance to the connector rod, and improves cleanability of the connector rod.

21. In a conveyor system having a plurality of interdigitated links connected by a steel connector rod having a surface subjected to wear as the result of sliding frictional contact with one or more of the links, the improvement comprising a nylon powder coating applied to the surface of the connector rod to form a durable outer shell without a gap between the connector rod and the outer shell in which food particles or debris may become trapped, whereby the outer shell serves to reduce friction between the links and the connector rod, provides enhanced wear resistance to the connector rod, and improves cleanability of the connector rod.

22. A method of manufacturing a conveyor belt section from a plurality of interdigitated links, comprising:

providing an electrically conductive connector rod for interconnecting the interdigitated links;

electrostatically applying a powder to a surface of the connector;

heating the power to form a protective outer shell; and connecting the interdigitated links with the coated connector to form the conveyor belt section.

23. A method of forming a connector for connecting a plurality of interdigitated links to form a conveyor belt section, comprising:

providing a steel rod for forming the connector for connecting the interdigitated links;

electrostatically applying a powder to a surface of the steel rod; and heating the powder to form a protective outer shell without a gap between the steel rod and the outer shell in which food particles or debris may become trapped, whereby the outer shell, in use, serves to reduce friction between the links and the connector rod, provides enhanced wear resistance to the connector rod, and improves cleanability of the connector rod.

24. The improvement for a conveyor system according to claim 1, wherein the outer shell is seamless.

* * * * *